US011410649B2

(12) United States Patent
Santiago et al.

(10) Patent No.: US 11,410,649 B2
(45) Date of Patent: Aug. 9, 2022

(54) VOICE COMMANDS TO FACILITATE IN-GAME COMMUNICATION

(71) Applicant: INTERNATIONAL BUSINESS MACHINES CORPORATION, Armonk, NY (US)

(72) Inventors: Ajiemar D. Santiago, Volente, TX (US); Jeffrey Stylos, Somerville, MA (US); German Attanasio Ruiz, Somerville, MA (US); Dustin Popp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 16/670,592

(22) Filed: Oct. 31, 2019

(65) Prior Publication Data
US 2021/0134285 A1 May 6, 2021

(51) Int. Cl.
*G10L 15/22* (2006.01)
*G06F 3/16* (2006.01)
(Continued)

(52) U.S. Cl.
CPC .............. *G10L 15/22* (2013.01); *A63F 13/30* (2014.09); *G06F 3/167* (2013.01); *G07F 17/323* (2013.01); *G10L 15/1815* (2013.01); *G10L 15/26* (2013.01); *G10L 15/30* (2013.01); *G10L 2015/223* (2013.01)

(58) Field of Classification Search
CPC ............ A63F 13/00; A63F 13/30; G06F 3/00; G06F 3/167; G07F 17/00; G07F 17/323; G10L 15/00; G10L 15/22; G10L 15/26; G10L 15/30; G10L 15/1815; G10L 2015/223

See application file for complete search history.

(56) References Cited

U.S. PATENT DOCUMENTS 6,456,977 B1   9/2002  Wang
7,713,127 B1 *  5/2010  Torre-Bueno ........... A63F 13/47
                                           463/35
(Continued)

FOREIGN PATENT DOCUMENTS

KR       20050012015 A    1/2005

OTHER PUBLICATIONS

Parker, Laura "The Voice-Activated Video Game," The Atlantic, Jan. 15, 2015, [Retrieved on Sep. 2, 2021], Retrieved from the Internet, <URL: https://www.theatlantic.com/technology/archive/2015/01/the-voice-activated-video-game/384454/ > (Year: 2015).*

(Continued)

*Primary Examiner* — Daniel C Washburn
*Assistant Examiner* — Sean E Serraguard
(74) *Attorney, Agent, or Firm* — Michael O'Keefe

(57) ABSTRACT

A method, computer system, and computer program product for in-game voice commands is provided. The embodiment may capture a user-spoken communication. The embodiment may also convert the captured user-spoken communication to a text file. The embodiment may further determine an intent of the converted communication using natural language processing. The embodiment may also execute a preconfigured audio file corresponding to the determined intent.

6 Claims, 5 Drawing Sheets

(51) Int. Cl.
*G10L 15/26* (2006.01)
*G10L 15/30* (2013.01)
*G07F 17/32* (2006.01)
*A63F 13/30* (2014.01)
*G10L 15/18* (2013.01)

(56) References Cited

U.S. PATENT DOCUMENTS

| | | | | |
|---|---|---|---|---|
| 2005/0256717 | A1* | 11/2005 | Miyata | G10L 15/1822 704/270 |
| 2006/0040718 | A1* | 2/2006 | Davis | A63F 13/10 463/9 |
| 2007/0218986 | A1* | 9/2007 | Van Luchene | A63F 13/792 463/30 |
| 2010/0292991 | A1 | 11/2010 | Lv | |
| 2013/0079134 | A1 | 3/2013 | Walker | |
| 2017/0285915 | A1* | 10/2017 | Napolitano | G06F 16/90332 |
| 2018/0314942 | A1* | 11/2018 | Shinn | G06N 3/08 |
| 2019/0308109 | A1* | 10/2019 | Sullivan | A63F 13/87 |
| 2020/0130195 | A1* | 4/2020 | Funazukuri | B25J 11/0015 |
| 2020/0384362 | A1* | 12/2020 | Shah | A63F 13/215 |

OTHER PUBLICATIONS

B. Andrus and N. Fulda. "Immersive Gameplay via Improved Natural Language Understanding." In International Conference on the Foundations of Digital Games (FDG '20). Association for Computing Machinery, New York, NY, USA, Article 55, 1-4. Published Online: Sep. 17, 2020 (Year: 2020).*

Mell et al., "The NIST Definition of Cloud Computing", National Institute of Standards and Technology, Special Publication 800-145, Sep. 2011, 7 pages.

\* cited by examiner

VOICE COMMANDS TO FACILITATE IN-GAME COMMUNICATION

BACKGROUND

The present invention relates generally to the field of computing, and more particularly to voice communication.

Voice communication software enables users to communicate remotely between devices, such as computing devices. Many typically chat-only communication programs have begun to integrate voice communication to allow users to more freely, naturally, and quickly communicate with each other. For example, collaboration software, such as persistent chat interfaces, have integrated voice communication to enable users the ability to collaborate without the burden of utilizing a keyboard, touchscreen, or other user input device.

SUMMARY

According to one embodiment, a method, computer system, and computer program product for in-game voice commands is provided. The embodiment may capture a user-spoken communication. The embodiment may also convert the captured user-spoken communication to a text file. The embodiment may further determine an intent of the converted communication using natural language processing. The embodiment may also execute a preconfigured audio file corresponding to the determined intent.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
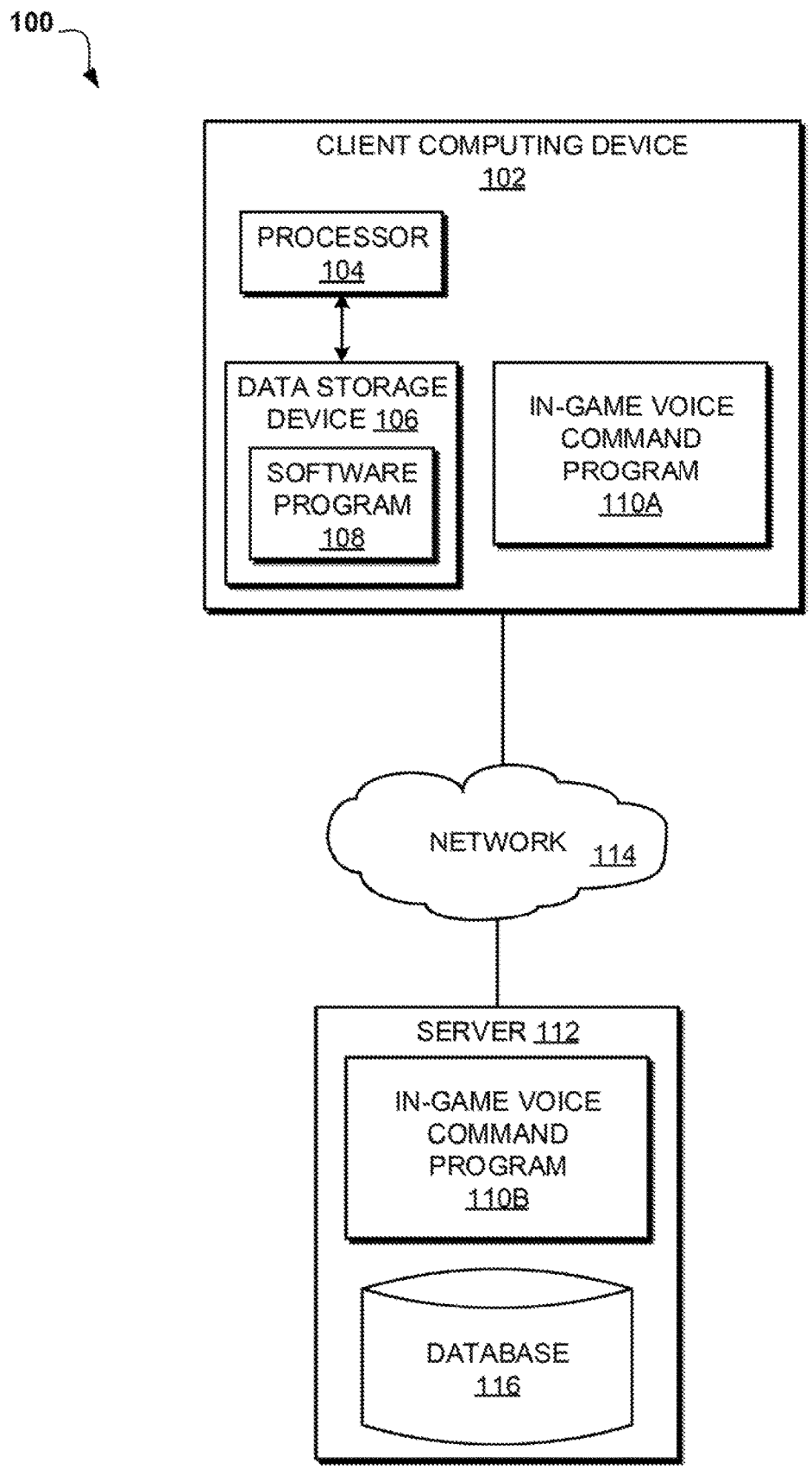
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to voice communication. The following described exemplary embodiments provide a system, method, and program product to, among other things, utilize speech-to-text and natural language processing (NLP) to parse user intent from audio data to determine a preset audio command to be played through a preconfigured, in-game interface. Therefore, the present embodiment has the capacity to improve the technical field of voice communication by filtering out inappropriate or untoward communications between players in a multiplayer gaming environment.

As previously described, voice communication software enables users to communicate remotely between devices, such as computing devices. Many, typically chat-only, communication programs have begun to integrate voice communication to allow users to more freely, naturally, and quickly communicate with each other. For example, collaboration software, such as persistent chat interfaces, have integrated voice communication to enable users the ability to collaborate without the burden of utilizing a keyboard, touchscreen, or other user input device.

However, with the increasing prevalence of voice communication software, the risk of being exposed to inappropriate or untoward content is also increased. Peer-to-peer voice communication in video games in particular can see a player removed from a game's immersive environment when an individual communicates in an inappropriate, lewd, or untoward manner to another player or a group of other players. Additionally, voice chat in a multiplayer video game environment can lead to cyber bullying and exposure to age inappropriate content. Due to this exposure, many users of multiplayer video games choose to opt out of voice chat features to limit the amount of "bad actors" they may encounter. As such, it may be advantageous to, among other things, filter out content that may be inappropriate, lewd, or untoward and replace such content preconfigured, in-game communications containing the same, or similar, intent.

According to at least one embodiment, speech-to-text and NLP technologies may be integrated with a peer-to-peer voice chat in a multiplayer video gaming environment to capture and analyze user speech. The intent of the captured speech may be determined and a preconfigured audio command may be selected and played within the peer-to-peer or group chat that has the same, or similar, intent as the captured user speech. In at least one embodiment, only user statements that are relevant to gameplay and facilitate in-game communication without the possibility of inappropriate communication may be processed. Any in-game communications that are not relevant to gameplay or do not facilitate in-game communication may be omitted from processing to the in-game chat interface or presented, transmitted to, or played to other users in the chat.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to process spoken user voice commands in an in-game chat through speech-to-text and NLP technologies, determining the intent of such commands, and playing a preconfigured audio command in-game based on the determined intent.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an in-game voice command program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an in-game voice command program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the in-game voice command 110A, 110B may be a program capable of capturing user voice data from a voice input device, such as a microphone, associated with a client computing device, determining, through text-to-speech and NLP technology the intent of the captured voice data, and playing a preconfigured audio file in the in-game peer-to-peer voice communication application that corresponds to the determined intent. The in-game voice command method is explained in further detail below with respect to FIG. 2.

Figure 2:
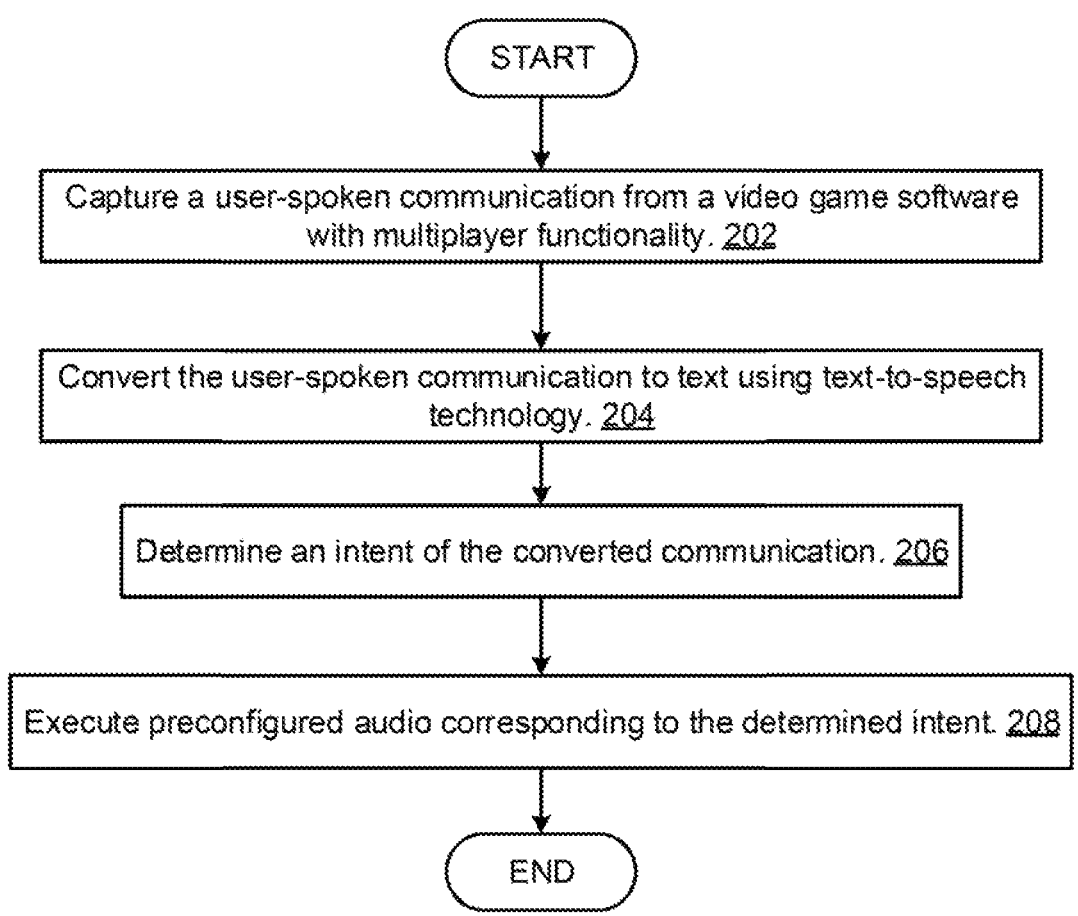
FIG. 2 illustrates an operational flowchart of an in-game voice command process according to at least one embodiment.

Referring now to FIG. 2, an operational flowchart illustrating an in-game voice command process 200 is depicted according to at least one embodiment. At 202, the in-game voice command program 110A, 110B captures a user-spoken communication from a video game software with multiplayer functionality. During gameplay, a user may normally speak into an audio capture device, such as a microphone, during regular gameplay to communicate with another in-game player. Upon detecting received user audio data, the in-game voice command program 110A, 110B may capture the audio data and store it in memory for analysis. For example, a user may be playing a video game with online multiplayer functionality. The video game may also allow users to communicate during gameplay through a peer-to-peer voice chat. During gameplay, a user may utter the phrase, "I could use some help here!". Upon detecting the user-spoken phrase, the in-game voice command program 110A, 110B may capture the audio data.

Then, at 204, the in-game voice command program 110A, 110B converts the user-spoken communication to text using speech-to-text technology. Once captured, the in-game voice command program 110A, 110B may convert the audio data to text so that it may be analyzed by known speech-to-text technology. For example, in the previous scenario where the user spoke the phrase "I could use some help here!", the in-game voice command program 110A, 110B may convert the spoken audio to text and save the text in a corresponding text file.

Next, at 206, the in-game voice command program 110A, 110B determines an intent of the converted communication. The in-game voice command program 110A, 110B may utilize known NLP technology to analyze the converted communication in order to determine the user's intent when speaking in the peer-to-peer voice chat. For example, the in-game voice command program 110A, 110B may analyze the converted text "I could use some help here!" and determine that the user intent was to seek aid from other users playing the game on the same competitive team as the user. In at least one embodiment, the in-game voice command program 110A, 110B may select the user intent from a preconfigured list of possible user intents. For example, game programmers may develop the game to understand only a limited series of intents, such as congratulatory, seeking aid, identifying a target, or cautionary.

Then, at 208, the in-game voice command program 110A, 110B executes preconfigured audio corresponding to the determined intent. Once the in-game voice command program 110A, 110B determines the intent behind the user-spoken text, the in-game voice command program 110A, 110B may select a phrase from a list of preconfigured phrases that the in-game characters are capable of speaking or preconfigured actions or animations the in-game character is capable of performing. For example, the identified intent from the previously described scenario where the user was seeking aid may have a corresponding preconfigured phrase of "Heal me!" or "Cover me!". In a different example, the in-game voice command program 110A, 110B have the in-game character perform a preconfigured, in-game animation that corresponds to the determined intent either concurrently to the audio file or in lieu of the audio file based on preconfigured settings or the in-game situation. For example, if the in-game voice command program 110A, 110B determines to execute a prerecorded animation associated with the intent of seeking aid, the in-game voice command program 110A, 110B may execute a character facial animation of the character saying the phrase "Heal me!" or a character body animation of the character waiving to teammate characters while pressing on a wound.

In at least one embodiment, the in-game voice command program 110A, 110B may instruct the game to play the prerecorded phrase through a character avatar associated with the player that spoke the original audio captured by the in-game voice command program 110A, 110B. For example, if the in-game voice command program 110A, 110B determined the prerecorded phrase to be played was "Heal me!" based on the user intent of seeking aid, then the in-game voice command program 110A, 110B may instruct the game to play the prerecorded audio "Heal me!" in the character voice with the corresponding facial and/or body animations for that character rather than playing the user-spoken audio originally captured by the in-game voice command program 110A, 110B.

In yet another embodiment, the in-game voice command program 110A, 110B may not execute an in-game animation for the character avatar if the determined intent is not relevant to preconfigured intents. For example, if a play is angry at an action that occurred in-game and yells expletives to the other players, the in-game voice command program 110A, 110B may determine the intent is of a scolding nature and does not correspond to intents that the preconfigured character animations or prerecorded audio and, therefore, may not execute any animation or audio.

It may be appreciated that FIG. 2 provides only an illustration of one implementation and does not imply any limitations with regard to how different embodiments may be implemented. Many modifications to the depicted environments may be made based on design and implementation requirements. For example, in at least one embodiment, a user may manually turn off the functionality of the in-game voice command program 110A, 110B so that all commands submitted to a voice chat are spoken or played through the chat interface rather than prerecorded audio.

In another example embodiment, the in-game voice command program 110A, 110B may enable an always-on filter where no peer-to-peer voice communication is transmitted and only prerecorded audio is played. In such a situation, all communication may be routed from a user to a speech-to-text program, which is analyzed using NLP software to determine user intent of the translated speech. The intent may be translated into any type of in-game action, such as commanding a non-player character or requesting assistance from other player characters. When commanding a non-player character, the captured intent may cause the software program 108 to execute game logic to command the non-player character to a predetermined position. When requesting player-controlled characters to perform a preconfigured action, the in-game voice command program 110A, 110B may translate the intent to an in-game animation of the player character and execute a prerecorded audio clip related to the requested action from other player characters.

In yet another embodiment, the in-game voice command program 110A, 110B may allow for player-to-player communication while also filtering untoward content. In such a scenario, speech may not be immediately transmitting into a voice chat. Rather, the spoken audio may be input to speech-to-text technology and natural language processing. In this situation, multiple models may be used to first classify whether the language spoken is acceptable speech (e.g., speech is not classified as cyberbullying, hate speech, or other such untoward content) then to classify the intent of the speech. If the in-game voice command program 110A, 110B returns a low confidence level that the speech is untoward, the in-game voice command program 110A, 110B may proceed with playing the actual speech spoken by the user to the in-game voice chat and determining the in-game intent of the speech. If the in-game voice command program 110A, 110B returns a high confidence that the speech is untoward, the in-game voice command program 110A, 110B may not send the actual speech spoken by the user to the in-game voice chat but, rather, execute prerecorded audio and/or animation. In at least one embodiment, this scenario may be enabled through preconfiguration by a user or a developer, such a parental control. In at least one other embodiment, the preconfiguration may increased or decreased in sensitivity based on a confidence level of the in-game voice command program 110A, 110B that untoward content is contained within the speech.

In yet another embodiment, the in-game voice command program 110A, 110B may utilize classifiers acting as an "always listening" moderator that, after a preconfigured threshold value of untoward content is spoken, remove a user from a voice chat session. In at least one other embodiment, when the preconfigured threshold value is satisfied, the in-game voice command program 110A, 110B may additionally report the user to a moderator or developer of the voice chat or software program 108. The in-game voice command program 110A, 110B may additionally store an audio log of the user speech.

In a further embodiment, the in-game voice command program 110A, 110B may utilize speech-to-text models and natural language classifiers to ingest speech from a plurality of languages within the same voice chat session, determining a user intent of the speech spoken in the plurality of languages, and executing a prerecorded audio clip and/or animation in the graphical user interface where the audio clip may be played in the language associated with or spoken by the user receiving the audio clip. For example, if two users are playing a video game where one user speaks English into a voice chat and another user speaks Spanish into the voice chat, the English user would hear a prerecorded in-game audio clip from the other user in English even though the other user may have spoken Spanish into the voice chat.

Figure 3:
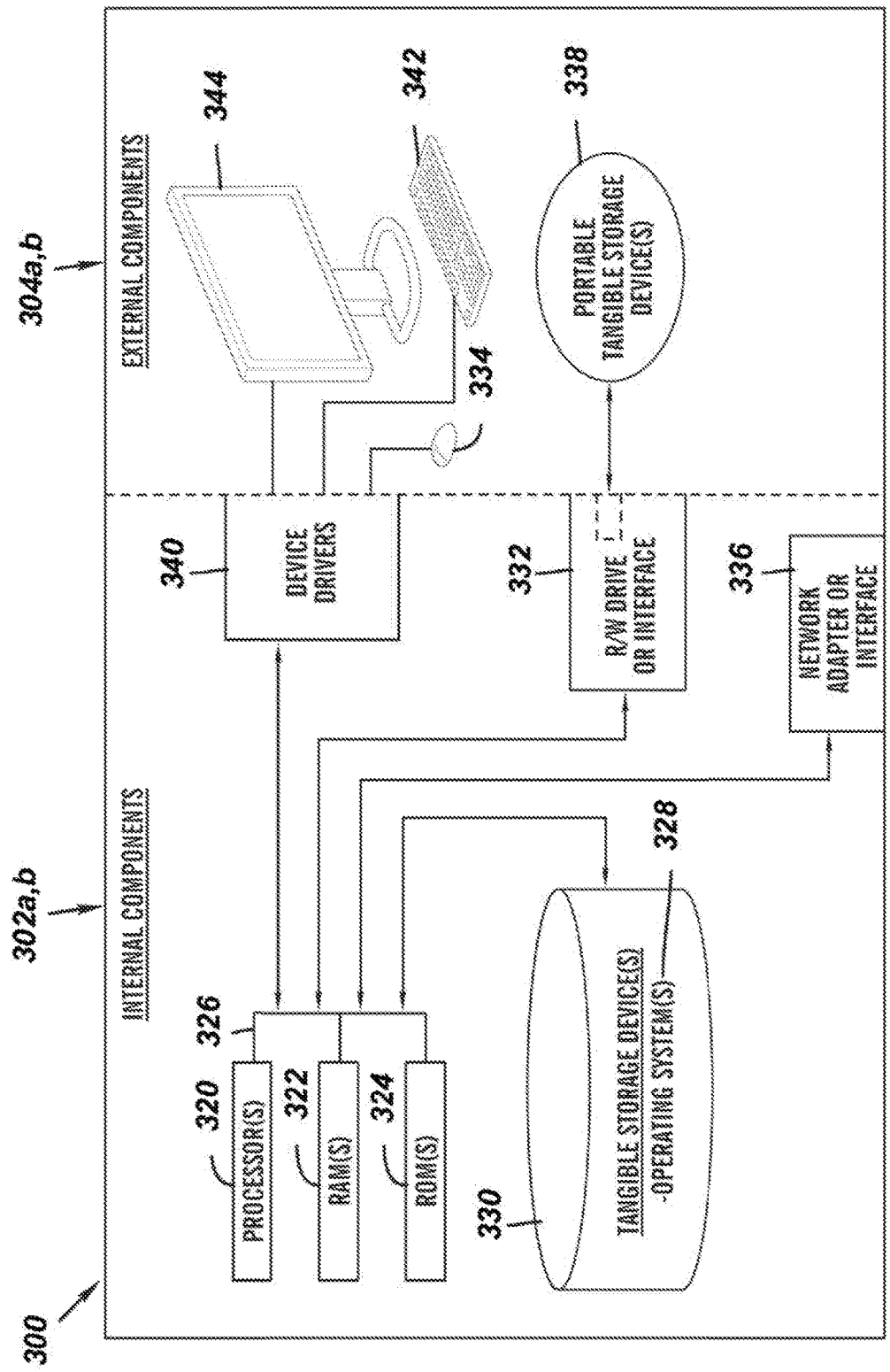
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the in-game voice command program 110A in the client computing device 102 and the in-game voice command program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the in-game voice command program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the in-game voice command program 110A in the client computing device 102 and the in-game voice command program 110B in the server 112 can be downloaded to the client computing device 102 and the server 112 from an external computer via a network (for example, the Internet, a local area network or other, wide area network) and respective network adapters or interfaces 436. From the network adapters or interfaces 336, the software program 108 and the in-game voice command program 110A in the client computing device 102 and the in-game voice command program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
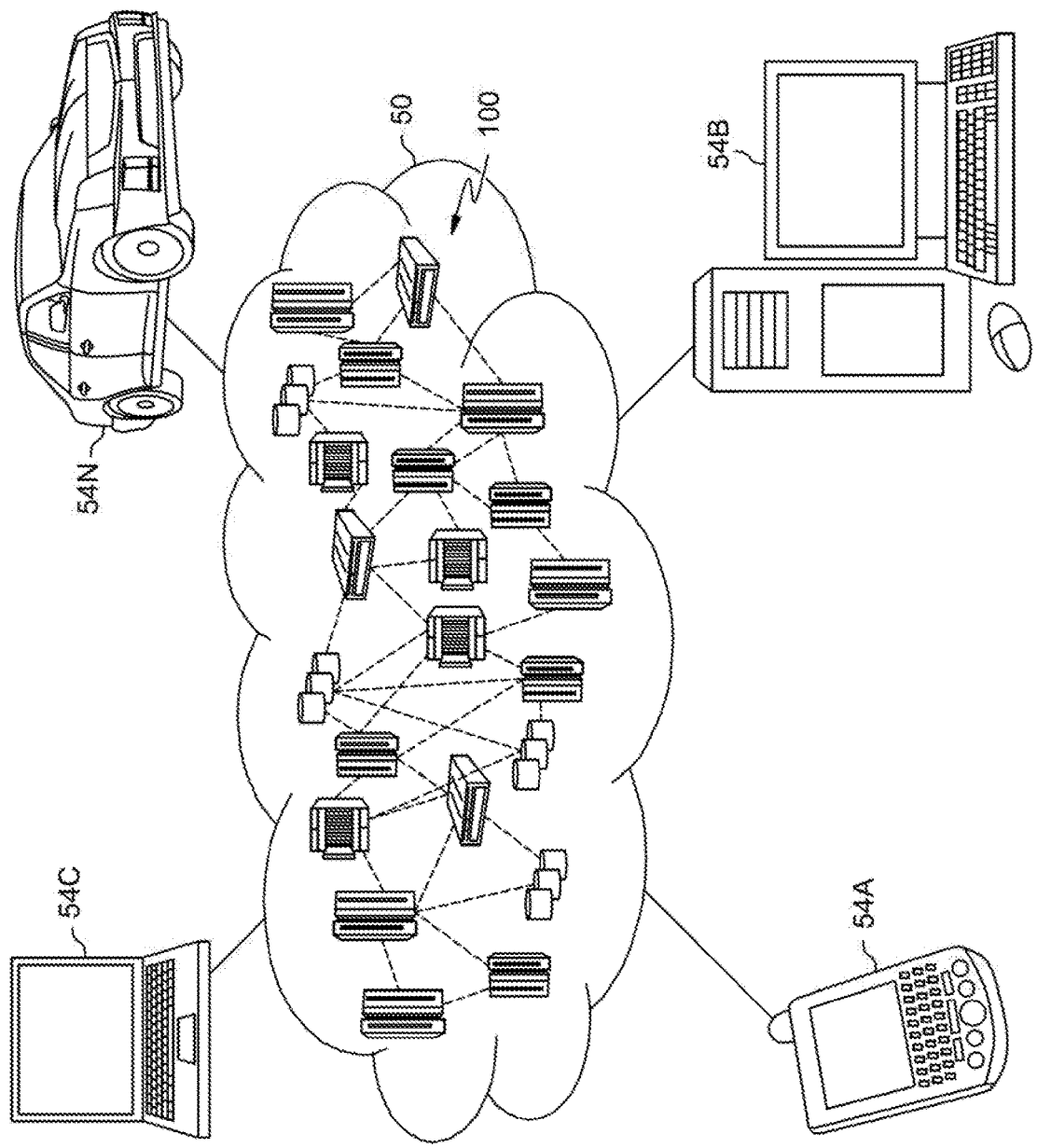
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
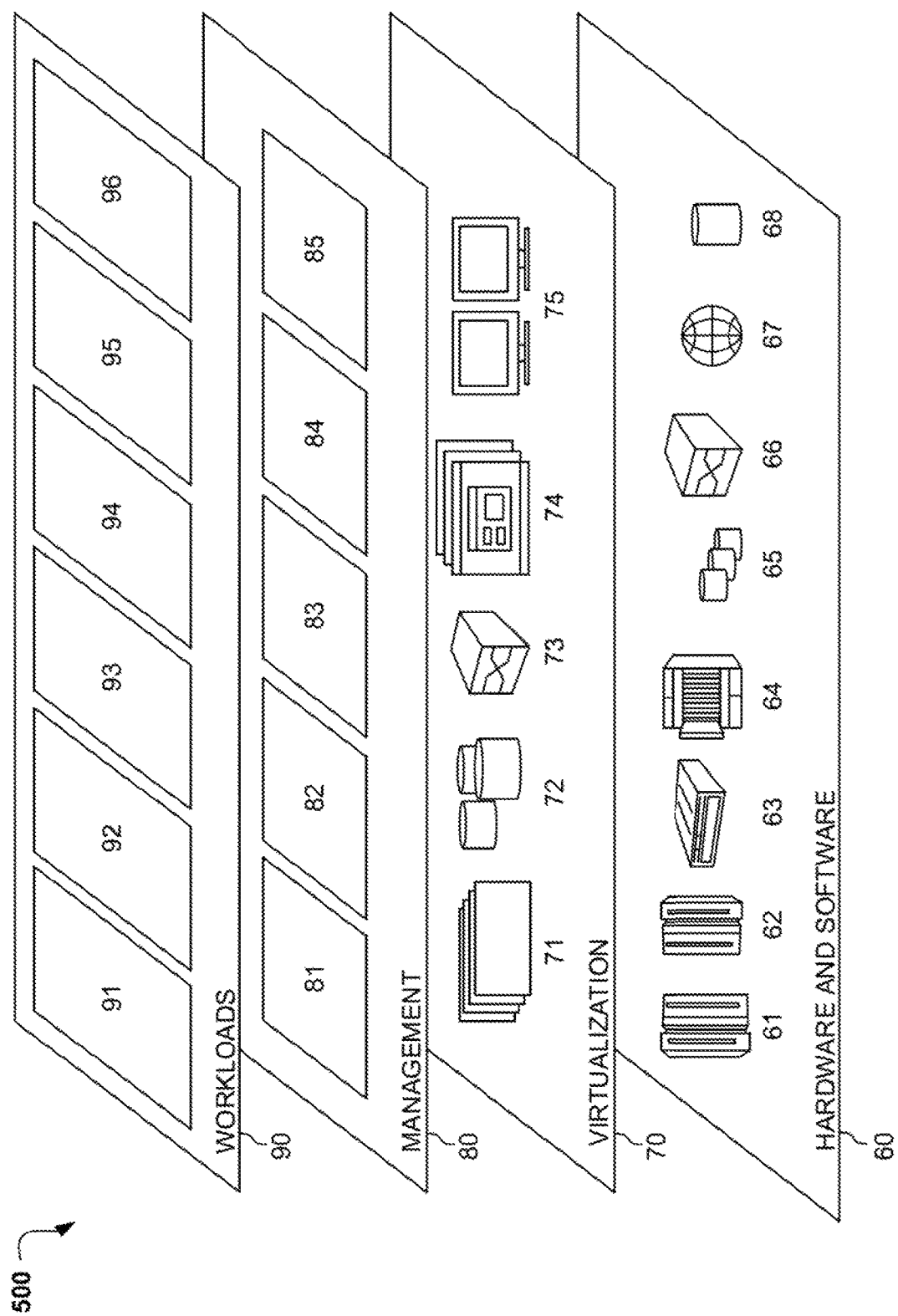
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-game voice command 96. In-game voice command 96 may processing captured user audio data input to a peer-to-peer communication program to determine an intent of the communication and transmit a prerecorded audio file and/or animation associated with the determined intent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for in-game voice commands, the method comprising:
    capturing, by a processor, a user-spoken communication in a multiplayer video game peer-to-peer chat;
    converting the captured user-spoken communication to a text file;
    determining an intent of the converted communication using natural language processing;
    selecting a preconfigured audio file from a list of preconfigured phrases associated with one or more user intents; and
    in response to determining the determined intent relates to gameplay or facilitating in-game communication:
        executing the preconfigured audio file of a prerecorded in-game character voice for a player character corresponding to the determined intent in place of the user-spoken communication; and
        executing an in-game character animation corresponding to the determined intent, wherein the in-game character animation comprises a facial animation and a body animation.

2. The method of claim 1, wherein the user-spoken communication is converted using speech-to-text software.

3. A computer system for in-game voice commands, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

capturing a user-spoken communication in a multiplayer video game peer-to-peer chat;
converting the captured user-spoken communication to a text file;
determining an intent of the converted communication using natural language processing;
selecting a preconfigured audio file from a list of preconfigured phrases associated with one or more user intents; and
in response to determining the determined intent relates to gameplay or facilitating in-game communication:
  executing the preconfigured audio file of a prerecorded in-game character voice for a player character corresponding to the determined intent in place of the user-spoken communication; and
  executing an in-game character animation corresponding to the determined intent, wherein the in-game character animation comprises a facial animation and a body animation.

4. The computer system of claim 3, wherein the user-spoken communication is converted using speech-to-text software.

5. A computer program product for in-game voice commands, the computer program product comprising:
one or more computer-readable tangible storage medium and program instructions stored on at least one of the one or more tangible storage medium, the program instructions executable by a processor capable of performing a method, the method comprising:
capturing a user-spoken communication in a multiplayer video game peer-to-peer chat;
converting the captured user-spoken communication to a text file;
determining an intent of the converted communication using natural language processing;
selecting a preconfigured audio file from a list of preconfigured phrases associated with one or more user intents; and
in response to determining the determined intent relates to gameplay or facilitating in-game communication:
  executing the preconfigured audio file of a prerecorded in-game character voice for a player character corresponding to the determined intent in place of the user-spoken communication; and
  executing an in-game character animation corresponding to the determined intent, wherein the in-game character animation comprises a facial animation and a body animation.

6. The computer program product of claim 5, wherein the user-spoken communication is converted using speech-to-text software.

* * * * *